US 6,655,259 B2

(12) United States Patent  
Snyder (10) Patent No.: US 6,655,259 B2  
(45) Date of Patent: Dec. 2, 2003

(54) FULL FLOW MECHANICAL FAIL SAFE (75) Inventor: Todd R. Snyder, Birmingham, AL (US)

(73) Assignee: Southern Research Institute, Birmingham, AL (US)

(*) Notice: Subject to any disclaimer, the term of this patent is extended or adjusted under 35 U.S.C. 154(b) by 78 days.

(21) Appl. No.: 10/085,101

(22) Filed: Mar. 1, 2002

(65) Prior Publication Data

US 2002/0129853 A1 Sep. 19, 2002

Related U.S. Application Data (63) Continuation-in-part of application No. PCT/US00/24960, filed on Sep. 13, 2000.
(60) Provisional application No. 60/153,223, filed on Sep. 13, 1999.

(51) Int. Cl.[7] .............................................. B01D 46/42
(52) U.S. Cl. ........................ 096/399; 096/400; 137/460; 137/498; 210/100; 422/220; 422/310
(58) Field of Search ...................... 96/399, 400; 95/22; 55/309, 310, 311, 417; 210/100; 137/459, 460, 498; 422/220, 310

(56) References Cited

U.S. PATENT DOCUMENTS

| 1,983,791 A | | 12/1934 | Carver |
| 2,635,629 A | | 4/1953 | Asaro |
| 2,680,451 A | | 6/1954 | Hill |
| 2,687,745 A | | 8/1954 | Hackett |
| 2,833,117 A | | 5/1958 | Wilcocks |
| 2,892,512 A | | 6/1959 | Watts et al. |
| 3,261,146 A | | 7/1966 | Malec |
| 3,478,881 A | * | 11/1969 | Bozek |
| 3,712,030 A | * | 1/1973 | PRiest |
| 4,026,685 A | * | 5/1977 | Grix |
| 4,071,038 A | * | 1/1978 | Robinson |
| 4,297,113 A | | 10/1981 | Theodore |
| 4,356,007 A | * | 10/1982 | Bowman |
| 4,373,548 A | * | 2/1983 | Chou |
| 4,485,011 A | * | 11/1984 | Cole et al. |
| 4,707,165 A | * | 11/1987 | Tauber et al. |
| 5,242,581 A | | 9/1993 | Mohr |
| 5,248,414 A | * | 9/1993 | Perkins |
| 5,348,572 A | | 9/1994 | Jelich et al. |
| 5,503,661 A | | 4/1996 | Brannstrom |
| 6,428,708 B1 | * | 8/2002 | Halemba et al. |

FOREIGN PATENT DOCUMENTS

| DE | 146 477 | 12/1903 |
| DE | 25 47 470 | 4/1977 |

* cited by examiner

Primary Examiner—Duane S. Smith  
(74) Attorney, Agent, or Firm—Rothwell, Figg, Ernst & Manbeck (57) ABSTRACT A full-flow mechanical failsafe is composed of a cylindrical shell having a movable sealing plug therein, for attachment to a reaction tube of a fluid treatment system, such as a gas clean up system in a power plant. The sealing plug rests on locking spheres within the shell during normal operation. Upon reaction tube failure or breakage, the flow of fluid will be substantially increased, causing an increase in upward pressure against the sealing plug, forcing it upward off the spheres and into a sealing contact with a flow aperture, shutting off fluid flow. The spheres move downward into a locking position upon movement of the sealing plug, to secure the sealing plug in its upward sealing position. The failsafe can be used in fluid flow control systems other than fluid filtering systems, such as oil or gas pipelines, and can be used to prevent improper reverse fluid flow.

20 Claims, 12 Drawing Sheets

FULL FLOW MECHANICAL FAIL SAFE

CROSS-REFERENCE TO RELATED APPLICATIONS

This application is a continuation-in-part of International Application Serial No. PCT/US00/24960 filed Sep. 13, 2000.

BACKGROUND OF THE INVENTION

1. Field of the Invention

This invention relates generally to fluid flow control systems, and to mechanical failsafes or shut-off devices for preventing the flow of fluids (eg, gas or liquid streams) upon breakage or failure of components in the system, such as filters or other components. More particularly, the invention relates to devices for preventing the flow-of high-temperature (e.g., up to 1800° F.) gas streams upon filter damage.

2. Description of Background Art

Industrial systems in which fluids flow (such as gas turbine power plants, liquid fuel processing plants, hydraulic systems, pneumatic systems, gas treatment or gas processing plants for, e.g. cleaning or reforming fuel gases, oil or gas pipelines, and the like), and in which gases are, e.g. transported, cleansed of entrained particulate matter or treated prior to coming into contact with system components that are susceptible to such particulate matter, often provide treatment systems for removing impurities and/or restricting flow to system design levels. To prevent damage to system components and/or the environment, such systems often are provided with flow limiting or shut-off valve mechanisms. Upon the occurrence of damage, breakage or removal of filter components, these shut-off mechanisms stop the flow of fluid through the system.

In particular, high temperature and high-pressure barrier filter systems are critical to the successful commercialization of PFBC and IGCC coal-based power plant systems. Presently the most commercially ready barrier filter systems are based on candle filter technology. These barrier filter systems generally employ a large number of individual, porous candle filter elements in parallel. Over the past decade, a variety of filter designs based on porous ceramic filter elements have been developed to provide cleanup of particulate-laden flue gas at high temperatures and high pressures (HTHP).

The most common filter design has been based on multiple rigid, cylindrical ceramic filter tubes placed in parallel across the process stream (so-called 'candle filters'). The process conditions to which these filter designs have been exposed have taxed the capabilities of the ceramic materials used to construct the individual filter elements, resulting in periodic failures of a significant proportion of these filter elements. Because the components downstream of these HTHP filters can be extremely sensitive to even small amounts of entrained particulate matter, these failures have revealed the need for a means to ensure the cleanliness of the flue gas downstream of the filter in the case of catastrophic failure of some portion of the filter components. Consequently, the requirements of any system or safeguard device (SGD) designed to deal with these failures must be quite stringent.

Pilot-scale candle filter-based systems have been shown to remove particulate matter down to a concentration of less than 1 ppm (part per million) when in good operating condition. However, in the event of the failure of even a single filter element, the filter system outlet dust loading will increase and thereby potentially damage gas turbine blades, contaminate other downstream processes, and limit the availability of the power system. A filter failure safeguard device which would prevent the flow of particle-laden gas through the failed filter element location would serve to minimize the potential damage to downstream equipment, minimize dust emissions, and allow the power plant to continue operation until a convenient or scheduled outage can be implemented.

Various types of flow limiting/shut-off mechanisms are known in the prior art, see e.g., U.S. Pat. Nos. 5,242,58; 3,261,146; 2,892,512; 2,833,117; 2,687,745; 2,680,451; 2,635,629; 1,983,791. Such mechanisms are characterized by their complicated structure, large number of moving parts, difficulty in installation, limited operational temperature ranges, and/or dependence on entrained particle concentration for activation of the shut-off feature.

There remains a need in the art for improvement to the structure of mechanical fluid flow shut-off devices.

SUMMARY OF THE INVENTION

The present invention provides an improvement to the prior art, by providing according to one embodiment a full-flow failsafe, including a reaction tube for containing a flowing fluid stream, a first shell having first apertures at each end thereof for enabling the fluid stream to flow therethrough, a first one of the first apertures being coupled to the reaction tube, a first sealing plug movably positioned within the first shell, the first sealing plug being oriented in a first position during normal operation of the reaction tube to permit fluid flow through the first shell, and being moved by increased fluid velocity to a second position wherein the first sealing plug forms a sealing contact with a second one of the first apertures, upon failure or breakage of the reaction tube, and at least one first locking mechanism supporting the first sealing plug in the first position, and being moved to a locking position for securing the first sealing plug in the second position in response to the movement of the sealing plug.

BRIEF DESCRIPTION OF THE DRAWINGS

The present invention can be more fully understood from the detailed description given below in conjunction with the accompanying drawings. These are provided by way of illustration only and are not intended as limiting the present invention, and wherein:

FIG. 2 is a cross-sectional diagram of a full-flow mechanical failsafe according to an embodiment of the invention in an active mode of operation, which prevents the flow of fluid through a damaged filter element 110a;

DETAILED DESCRIPTION OF THE PREFERRED EMBODIMENT

Figure 1:
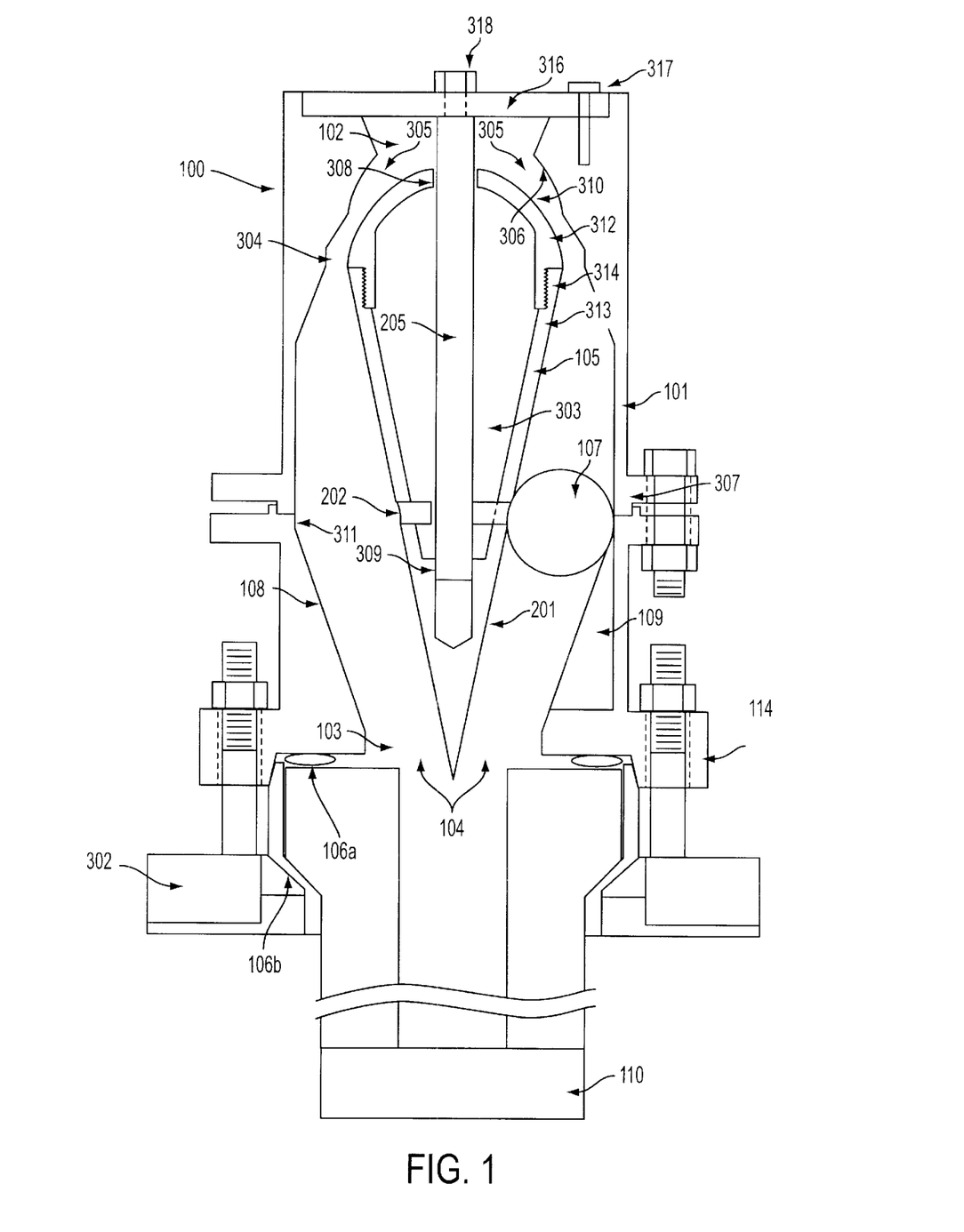
FIG. 1 is a cross-sectional diagram of a full-flow mechanical failsafe 100 according to an embodiment of the invention in an inactive mode of operation (allowing normal fluid flow)

Referring to FIG. 1, the full-flow mechanical failsafe according to one embodiment of the present invention is particularly adapted for candle filter systems including candle filters 110. Such candle filter systems would be used, for example, in power plants for removing dust and other solid particle pollutants or contaminants from gases at temperatures up to approximately 1650° F. flowing through various stages of the power plant equipment.

There are two primary causes for dust to reach the clean side of candle-based filter systems. The first is the existence of small leaks around filter element gaskets or seals resulting from faulty gasket components or improper installation. In such an instance the flow path of dust-laden gas leaking across the tubesheet 302 would bypass the candle filter element 110 and its safeguard device. The only remedy for a failure of this type is prevention through quality control of gasket materials and installation procedures.

The second cause is the case wherein solid particles breach the tubesheet 302 as a result of catastrophic failure or breakage of one or more candle filter elements 110. Failures of this type have been experienced at many pilot- and demonstration-scale Hot Gas Cleanup (HGCU) filter systems, and present the primary challenge for system reliability that is addressed by the present invention.

The mechanical failsafe device 100 according to one preferred embodiment of the present invention includes a cylindrical shell 101, about 3 inches in diameter and about 4 to 5 inches in height. Apertures 102 and 103 are centered at the top and bottom of the shell 101, and allow filtered flue gas to flow upward through the device in a flow direction indicated by arrows 104 during normal operation, and pulse cleaning gas to flow downward through the device in an opposite direction, when an intact and operational filter element 110 may be connected to the failsafe.

A sealing plug 105 may be provided in the interior of the cylindrical shell 101. Sealing plug 105 may be essentially in the shape of a hemisphere joined on its lower flat surface to the flat surface of a cone of equal diameter to the hemisphere. The sealing plug 105 may be supported in the shell by three locking spheres 107, (only one of which is shown for simplicity) preferably positioned 120° from each other around the conical portion of the sealing plug. The spheres rest in grooves or channels 109 in a conical surface 108 in the shell interior, and also contact inner angled surface 311 of the shell 101.

Figure 3:
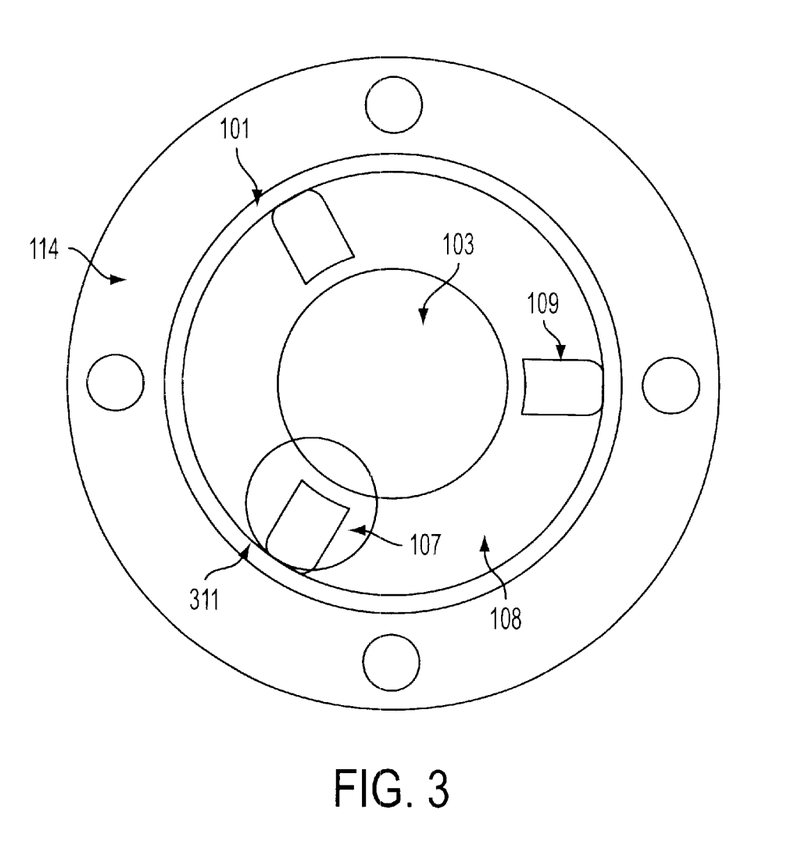
FIG. 3 is a top view of the sloped bottom surface of the failsafe shell, showing the presence of grooves 109 for locking spheres 107 (only one of which is shown)

As shown in FIG. 3, the grooves 109 may be cut into the surfaces 108 under the spheres 107 to guide their movement when the mechanical failsafe is activated, as explained further below. Additionally, as shown in FIG. 4, a continuous indentation 202 may be formed around the circumference of the lower surface 201 of the sealing plug, at a position where the indentation 202 contacts the spheres as shown in FIG. 1, to assist in holding the sealing plug in the inactive position during the occurrence of vibrations that may be experienced in the filter vessel during installation and normal operation.

The diameter of the spheres 107, the dimensions of the shell 101, the sealing plug 105, the conical surfaces 108 and 201, the apertures 102, 103 and the annular gap 304 between the inner surface of the shell 101 and the sealing plug 105 at its widest dimension are designed such that, with the normal flowrate of filtered gas upward through the failsafe, the upward pressure on the sealing plug 105 will not be sufficient to cause the sealing plug 105 to be lifted from its resting position on the spheres 107 when the filter element 110 is intact. The weight of the sealing plug 105 can be selected during design by adjusting the size of the internal volume 303, or in other words a portion of the interior of the sealing plug may be solid to establish the optimum weight to ensure the proper stability of the plug on the spheres during normal operation for the particular flow parameters of the system on which it is installed.

Figure 2:
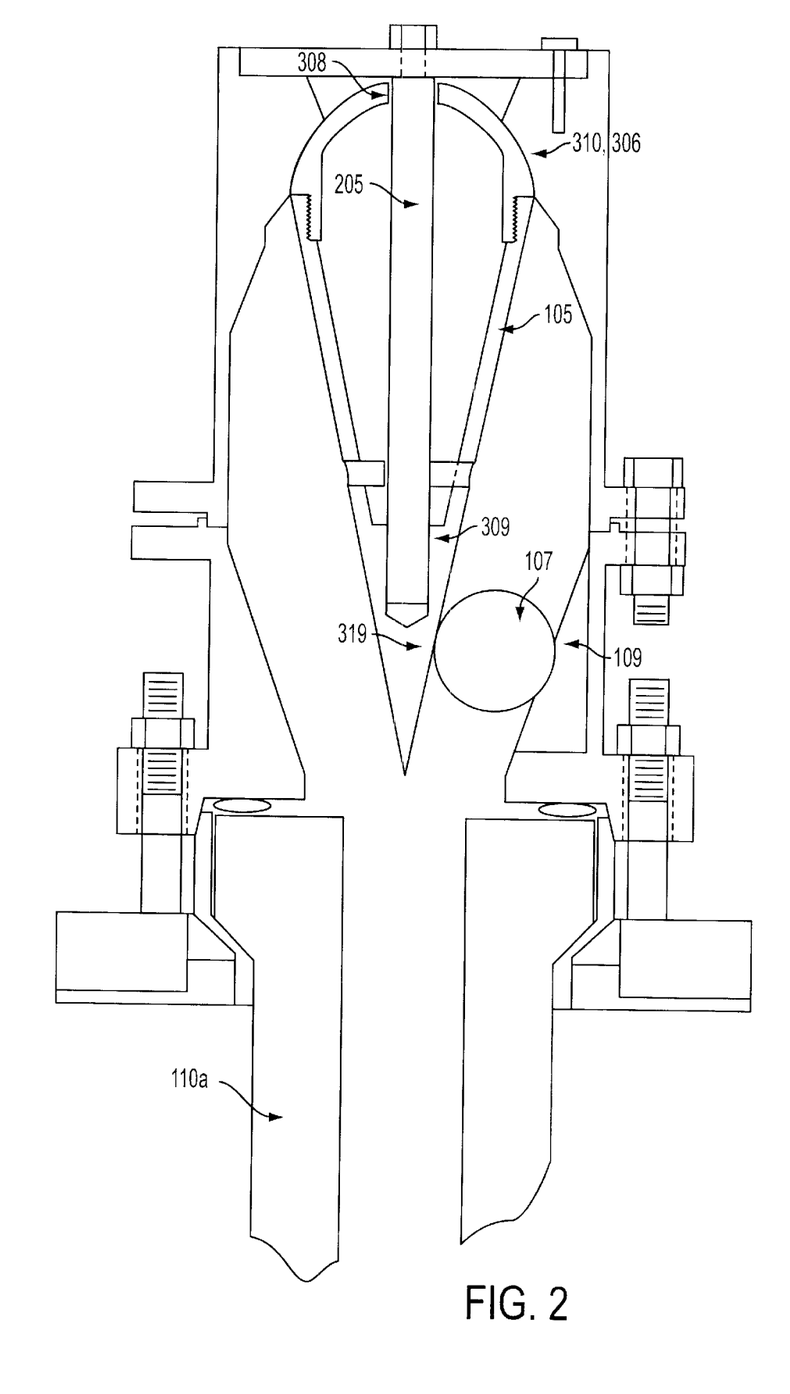
Figures 4A, 4B:
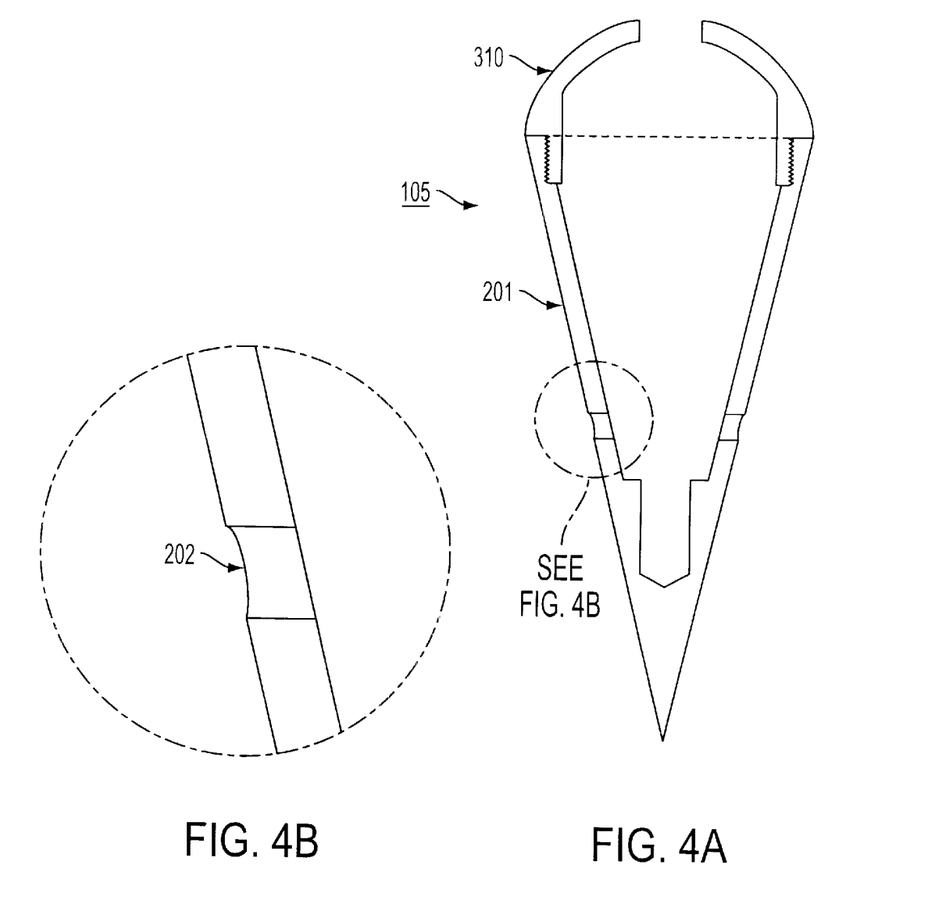
FIG. 4 is a side view of sealing plug 105 with a hemispherical sealing surface 310, with an enlarged sectional view of conical surface 201 showing the presence of a concave indentation 202 for maintaining locking spheres 107 in place in the inactive mode.

In the preferred embodiment as shown in FIGS. 1, 2 and 4, the hemispherical portion 312 of the plug may be provided as a separate piece from the conical portion 313. This allows the amount of internal volume 303 to be selected at the manufacturing stage, either by manufacturing conical portions 313 of varying internal volume, or by filling the internal volume 303 with an appropriate amount of a suitable material for adjusting the weight of the sealing plug 105. The two pieces 310 and 313 are then joined together. As shown in FIG. 1, a threaded connection 314 may be provided for this purpose; other joining methods may be used equivalently. The weight of the sealing plug also may be determined by the degree that the upward flow must increase (as would occur in a failure) in order to lift the sealing plug and activate the failsafe (as shown in FIG. 2). For a specific barrier filter installation application as shown in FIG. 1, the weight of the sealing plug and the dimension-of the gap 304 are set so that only the flowrate encountered in a failure of the filter element will be sufficient to lift the sealing plug enough to activate the failsafe device.

As shown in FIG. 1 the failsafe 100 may be attached to the tubesheet 302 with the aid of a mounting bracket or flange 114. Other attachment mechanisms may be used, depending on the tubesheet design. A gasket 106a may be provided between the failsafe and the filter, and an additional gasket 106b may be provided between the filter element 110 and the tubesheet 302. Gaskets 106a and 106b may be made of Nextel® or similar material.

The shell 101 may be constructed from two separate pieces, joined together at flange 307 or by other equivalent joining means, to enable installation and removal of the sealing plug and locking spheres. The configuration shown in FIG. 1 may include a circular, compressible gasket between the two pieces of the shell, which may be joined at the flange used to mount the SGD to the tubesheet. Other means of joining the shell pieces during assembly, including welding, could conceivably be used.

The apertures 102, 103 and the annular gap 304 should be sized such that sufficient flow paths are maintained within the failsafe for the passage of filtered flue gas and pulse cleaning gas to minimize the addition of flow resistance to the system by the failsafe during either filtering or pulse cleaning operations.

In the inactive (i.e., normal) mode of operation, the upward flow 104 of filtered flue gas provides an increased pressure in the lower portion of the failsafe 100, having a magnitude determined by the velocity v and the density p of the gas according to Bernoulli's term $\frac{1}{2} \rho v^2$, as shown in Equation 1, $$P = \frac{1}{2}\rho(v/Cd)^2 \qquad (1)$$

where Cd is the discharge coefficient of the annular orifice (approximately 0.75 for the design shown in FIG. 1).

A large proportion of this pressure will be dissipated across the annular gap 304. Constrictions in the annular gap act as an annular orifice for gas flow; the smaller this annular orifice, the more pressure may be dissipated as the gas passes through it.

During application of reverse gas pulses used to clean the filter elements, or in other cases where downward flow is the normal flow direction, the downward pressure exerted on the plug by the flow 305 from such pulses, or flow, may be transferred through the spheres 107 to the inner wall 311 and the sloped inner surface 108 of the shell.

A sufficiently high upward force, generated by the dissipation of pressure across the annular orifice, must be applied to the sealing plug to initiate activation of the failsafe 100. As Equation 1 defines, this force is proportional to the density of the gas and the square of its velocity through the annular orifice described above. The weight of the sealing plug 105 and the cross-sectional area of the annular orifice between the plug and the shell can be adjusted in the design process to set this threshold of activation at the desired level.

Identifying the proper activation threshold requires some knowledge or estimate of the operating conditions at the point in the process where the failsafe 100 will be located (usually the filter tubesheet). Proper selection of the activation threshold will ensure that the conditions sufficient to activate the device may occur when its filter element 110 fails. The activation threshold (approximately 7 in. $H_2O$) may be about five times the normal pressure drop across the annular orifice (approximately 1.5 in. $H_2O$), and almost three times an expected maximum value for the process. By setting this threshold above an expected maximum value for the intended process, a safety margin against unintended activation may be established.

In the case of the failure of its filter element 110, the magnitude of the pressure differential across the tubesheet determines the gas velocity through the failsafe 100. Therefore as the threshold of activation is increased, the minimum tubesheet pressure drop at the time of filter element 110 failure, below which the failsafe 100 will not activate, is also increased .

The relationships governing the activation of the failsafe 100 allow a wide "window of activation". Balancing the insensitivity to process upsets with the ability w to activate with a low tubesheet pressure drop, however, may involve consideration of the operating parameters in the failsafe 100 design. As the magnitude of the normally expected pressure drop across the filter element at risk of failure increases, a much wider latitude can be exercised in setting the limits of the failsafe 100's window of activation.

When the filter element 110 breaks, as shown in FIG. 2, two conditions change in the vicinity of the mechanical failsafe 100. The first is that the upward velocity of the gas through the remaining part of the broken filter element and the mechanical failsafe increases very rapidly, driven by the tubesheet pressure drop (not shown) at the time of breakage.

The second is that particle-laden or unfiltered or untreated gas advances from the point of breakage of the filter element 110 towards the top of the candle filter element and the mechanical failsafe 100. Because the failsafe 100 is desirably activated almost instantaneously in response to the rapid increase of upward gas velocity experienced in a filter element 110 failure, little or no particle-laden gas or untreated gas may be expected to exit the top of the failsafe before the failsafe may be fully activated and the flow of gas may be shut off.

In the event of filter element 110 breakage, the increased gas velocity through the mechanical failsafe 100 creates a significantly higher pressure drop across the annular orifices around the sealing plug, thereby significantly increasing the upward pressure on the sealing plug itself. The degree to which the velocity of the gas entering the mechanical failsafe will be increased upon the breakage of a filter element may be primarily dependent upon the tubesheet pressure drop and the dimensions of the portion of the broken filter element that remains attached to the tubesheet.

Calculations have indicated that, following the breakage of a filter element, the velocity of gas through the mechanical failsafe could be increased by a factor of 10 or more (with the concomitant increase of upward pressure on the sealing plug increasing by a factor of 100 or more).

Upon the occurrence of a sufficiently higher pressure drop across the annular orifice around the sealing plug, as would happen upon the breakage of a filter element 110, the increased upward gas pressure on the sealing plug will lift the sealing plug up from its resting position on the spheres. The plug will continue to move upward until it contacts the upper sealing surface 306 around the upper aperture 102, as shown in FIG. 2. The diameter of this upper sealing surface may be made equal to the diameter of the hemispherical surface of the sealing plug, so that a high-quality seal will be formed when these two surfaces contact each other in the activated mode as shown in FIG. 2.

As shown in FIG. 1, the interior of the shell 101 can be shaped such that the pressure across the annular orifice adjacent to the widest portion of the sealing plug would increase as the plug travels upward by making the annular gap smaller as the plug nears the sealing surface 306 at the top of the shell 101.

Once the sealing plug reaches the top of the shell and fully contacts the sealing surface 306, the gas flow may be completely blocked and the upward force may be reduced to zero. Just before this time, the spheres 107 begin to roll down the inclined surface 108 in a straight direction aided by the grooves 109, as shown in FIG. 2, until the spheres become pinched in position at the bottom of the sealing plug 105 at location 319, between the plug and the grooves 109 in the inclined surface of the shell.

In this regard the dimensions of the spheres, shell and sealing plug are designed to prevent the spheres from falling down through the aperture 103 at the bottom of the shell (see FIG. 1). When the spheres reach their final position as shown in FIG. 2, they serve as locks securing the sealing plug against the sealing surface 306 of the upper aperture 102 of the shell, to thereby prevent the flow of dust and/or untreated gas past the failsafe, and also to prevent the sealing plug from being forced back down into the shell by the pressure from reverse flow gas cleaning pulses.

As shown in FIG. 2, an optional axial alignment pin 205 may be attached to the top of the shell and extends into the body of the sealing plug through a loosely slip-fit guide hole 308 and through the body into a second guide hole 309. Because this pin fits only loosely in the central hole of the sealing plug, the upward motion of the plug may be guided by only intermittent contact with the pin, rather than a continuous sliding action, which would most likely be problematic at HGCU environmental conditions.

Figure 5:
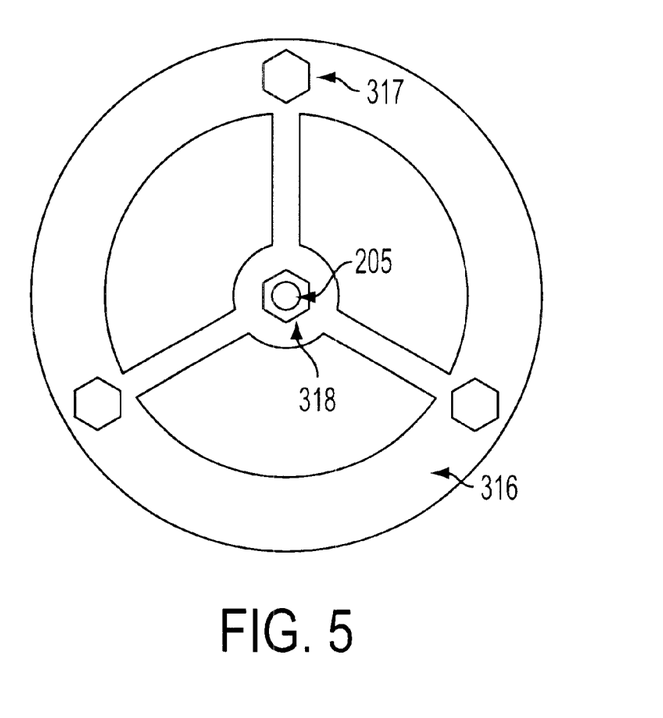
FIG. 5 is a top view of frame 316 which secures alignment pin 205 to the shell 101 and establishes proper positioning of the alignment pin.

As shown in FIG. 5, the alignment pin may be attached to the top of the shell with a frame 316 through a threaded connection 318. The frame 316 may be attached to the shell with screws 317. The alignment pin alternatively may be attached to the sealing plug and extend through guide holes in the shell. The alignment pin 205 assists in the proper seating of the sealing plug against the sealing surface 306 of the shell.

Further, during installation in the filter vessel, a small amount of paraffin may be used to hold the sealing plug and spheres in their proper positions within the shell by application to the contacting surfaces of the spheres. The paraffin would melt and burn off as the filter system is preheated during a system startup process. Reapplication of paraffin would be unnecessary except where a failsafe had to be removed, reconditioned and reinstalled after activation by the failure of its filter element.

The full-flow mechanical failsafe of the present invention provides several advantages over failsafe devices that make use of entrained particles in the flowing gas to form a seal. The formation of a seal by using such entrained particles takes place gradually, whereas the mechanical failsafe of the invention shuts off the flow of particle-laden gas almost immediately upon filter breakage. The effectiveness of the mechanical failsafe is thus independent of particle concentration.

Further, seals that depend on plugging of flow paths by entrained particles can be compromised by the application of periodic reverse flow cleaning gas pulses. In contrast, the failsafe of the present invention provides a positive seal against the force exerted by such cleaning pulses. In the event a failure occurs during application of a cleaning pulse, the failsafe will be activated as soon as the normal fluid flow direction is reestablished.

Reconditioning of activated failsafes is fairly simple. All components are preferably made of suitable material (such as 310 stainless steel, which is well suited to HGCU filter applications, or $Si_3N_4$, from which off-the-shelf balls can easily be obtained), which can be washed, dried, reconfigured in an inactive mode, and reinstalled.

The basic principles of the full-flow mechanical failsafe may be adapted in alternate embodiments for applications other than HGCU particle filtration. For example, similar devices of much larger scale may be used in an oil or gas pipeline. The failsafe devices would be positioned at periodic intervals along such pipelines, in short vertical runs where the flow direction is upward. In the event of pipeline failure, the fluid flow would increase most immediately upstream from the failsafe device, activating it and shutting off the flow, thus minimizing fluid loss as well as potential safety and environmental hazards.

Another alternate embodiment of the invention could be configured such that even a small upward flow of fluid would activate the device. This embodiment would be useful to prevent backward flow in a system where the normal fluid flow direction was downward.

Figure 6:
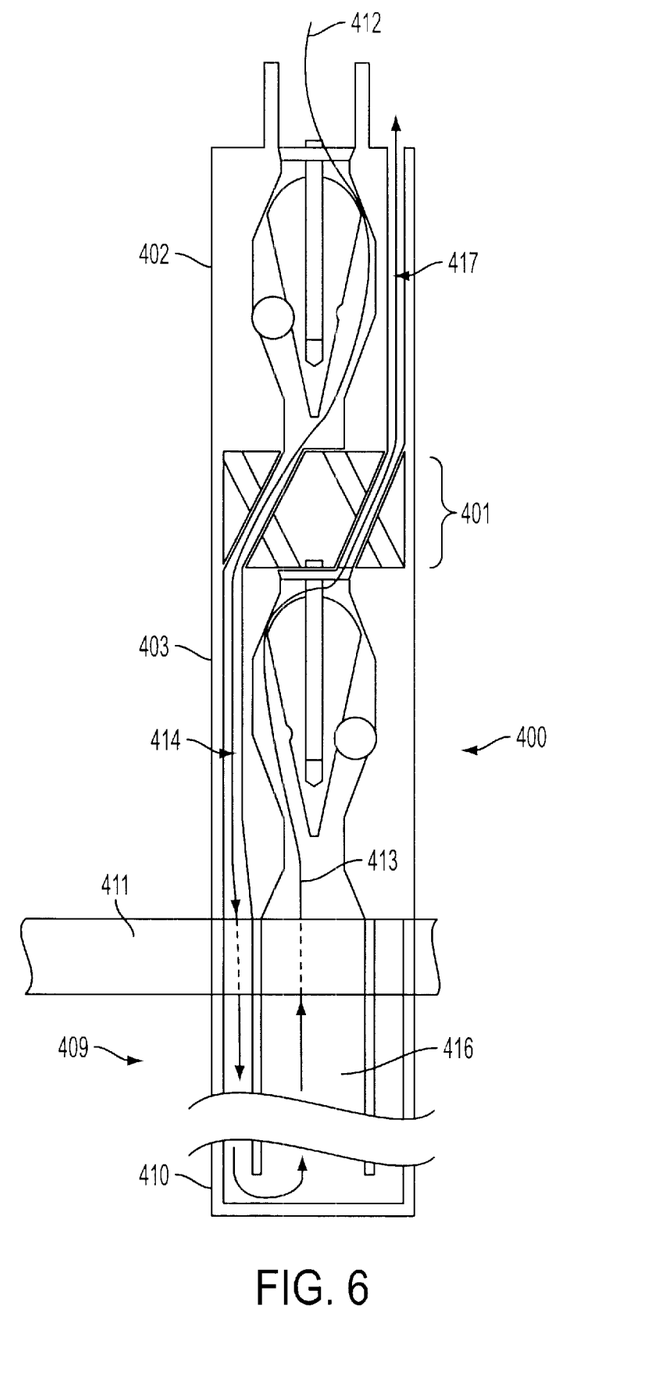
FIG. 6 is a cross-sectional diagram of a full-flow mechanical failsafe 400 according to a second embodiment of the invention, in an inactive mode of operation.

In FIG. 6 is shown a second embodiment of the invention, in which failsafe 400 comprises a plurality of manifolds 401 in series. Manifold 401 could be used e.g. in conjunction with two full flow mechanical failsafes 402, 403 stacked vertically. As an example in which this type of manifold 401 would be used, FIG. 6 displays such an arrangement adapted to a high pressure fluid 409 application with a reaction tube 410 containing lower pressure fluid 416. The reaction tube 410 may be positioned below a tubesheet 411 and may be at risk of failure.

The full flow mechanical failsafes are configured to shut off flow from two lower pressure fluid flow paths 412, 413. In this example, the lower pressure fluid flows downward through one full flow mechanical failsafe 402 and then flows upward along a prescribed path 413 through the other full flow mechanical failsafe 403 when the reaction tube is intact.

Figure 7:
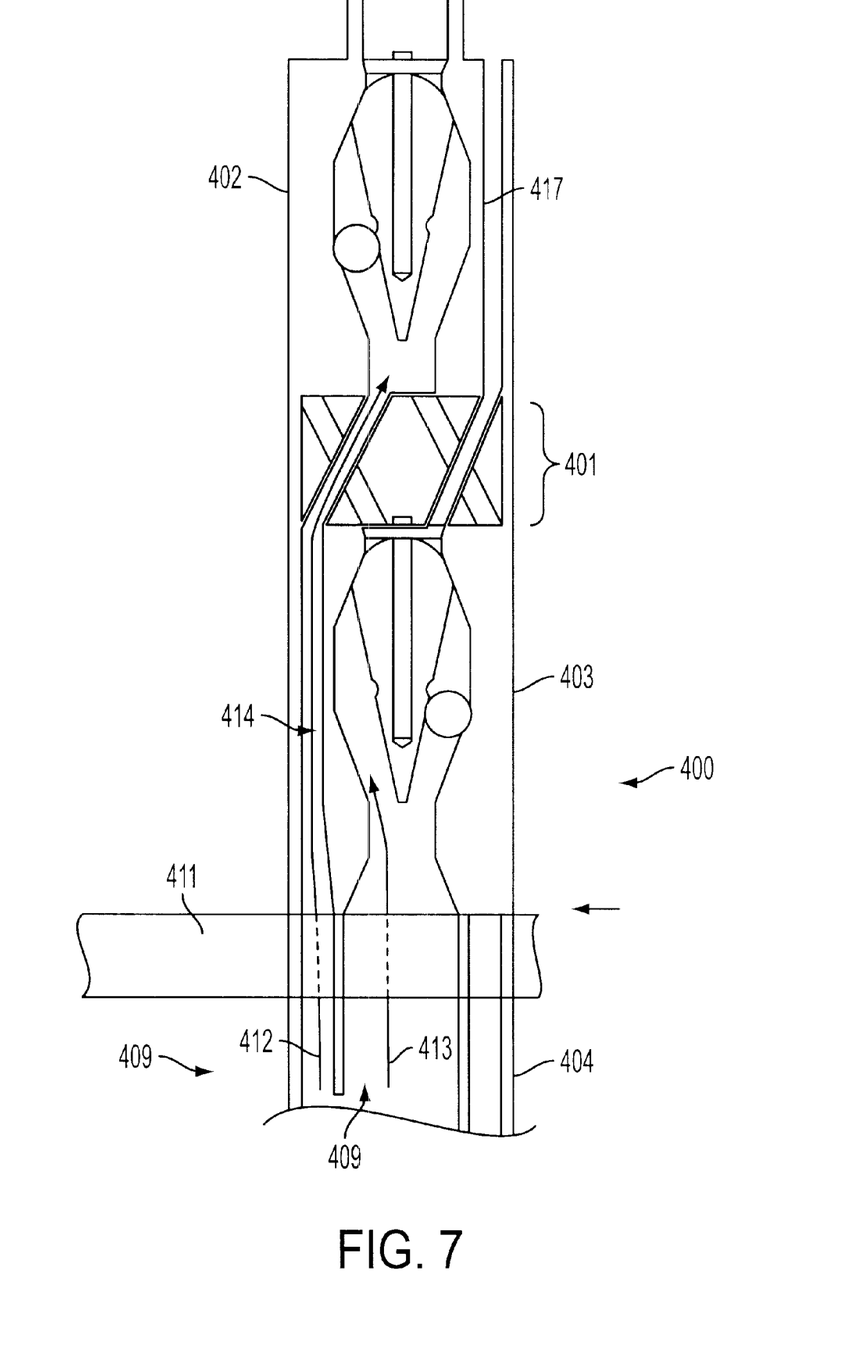
FIG. 7 is a cross-sectional diagram of full-flow mechanical failsafe 400 according to the second embodiment of the invention in an active mode of operation.

In the event of the failure of the reaction tube, as shown in FIG. 7, the high pressure fluid advances upward along both flow pathways 412, 413, each pathway passing through one of the full flow mechanical failsafes, causing both of them to activate. Thus, the manifold allows two flow paths to be controlled by two full flow mechanical failsafes arranged in a compact manner.

In this embodiment of the manifold, the lower full flow mechanical failsafe 403 includes one or more flow paths 414 in its shell wall to channel flow to or from the opening in the bottom of the upper full flow mechanical failsafe from or to the reaction tube. Similar channels 417 in the shell wall of the upper full flow mechanical failsafe channel flow from the opening at the top of the lower full flow mechanical failsafe upward around the body of the upper full flow mechanical failsafe.

In addition, for close packing of each of these assemblies, a hexagonal shape could be used for the outside of the full flow mechanical failsafe shells. The six points of the hexagon would provide convenient locations for the various manifold flow paths.

Figure 8:
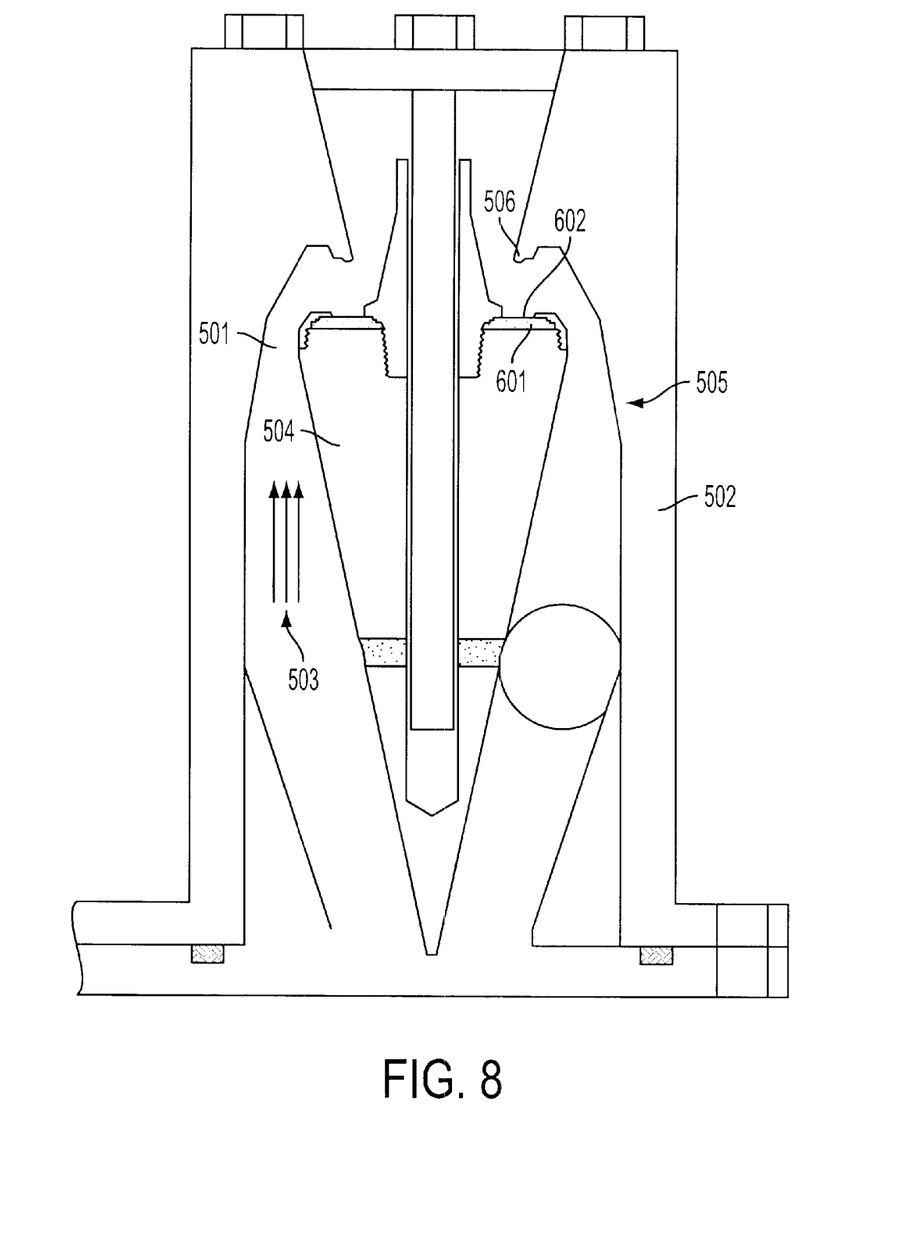
FIG. 8 is a cross-sectional diagram of a full-flow mechanical failsafe according to a third embodiment of the invention, in an inactive mode of operation.

In a third embodiment of the invention, shown in FIG. 8, a tapered annular orifice 501 may be, eg. incorporated into many possible embodiments of the full flow mechanical failsafe 502. The purpose of the tapered annular orifice 501 is to cause the lifting force derived by the fluid 503 passing upward through the orifice to increase as the sealing plug 504 rises during activation, thus ensuring a rapid and complete activation process.

The tapered annular orifice design may be derived by shaping the inner wall surface of the portion of the full flow mechanical failsafe shell 505 so that, as the sealing plug moves vertically upward during activation, the cross-sectional area of the orifice decreases continuously until the sealing plug makes contact with the upper portion of the shell 506, shutting off the fluid flow. The inner wall of the shell may be tapered conically as shown in FIG. 8, but other profiles may also be applied.

In an alternate embodiment, also shown in FIG. 8, a circular gasket 601, open in its center, could be positioned in the upper body of the sealing plug 504 designed as shown in FIG. 8. This gasket would be compressed or deformed by the contacting surface of the upper portion of the shell 506 upon activation of the full flow mechanical failsafe 502, forming a seal against fluid flow. In this embodiment, the seal formed by the full flow mechanical failsafe during activation could make use of a variety of different materials to form the seal against flow. As shown in FIG. 8, the sealing plug could be made in two pieces to clamp down on the gasket during assembly and to allow the gasket to be replaced after activation.

In an alternate embodiment, also shown in FIG. 8, a foil cover 602 for gasket 601 may, e.g. ameliorate abrasion of the gasket 601 by the flowing gas stream prior to activation. The foil cover 602 may be, e.g. a thin metal foil laid over or wrapped around the gasket 601 to protect it. The foil cover 602 would be secured in place in the same manner as the gasket 601. The top sealing surface of the shell 506 would cut the foil 602 as the gasket 601 was compressed during activation.

In an alternate embodiment of the full flow mechanical failsafe 502, as shown in FIG. 8, the gasket 601 could be fabricated from a metal, such as gold or platinum, that could remain malleable while withstanding the process conditions to which the full flow mechanical failsafe was exposed. Because the metal gasket 601 would deform when the sealing plug 504 contacted the contacting surface of the upper portion of the shell 506, a high quality seal would be formed that would not depend on the buildup of entrained particles on the high pressure side of the sealing gasket.

Figure 9:
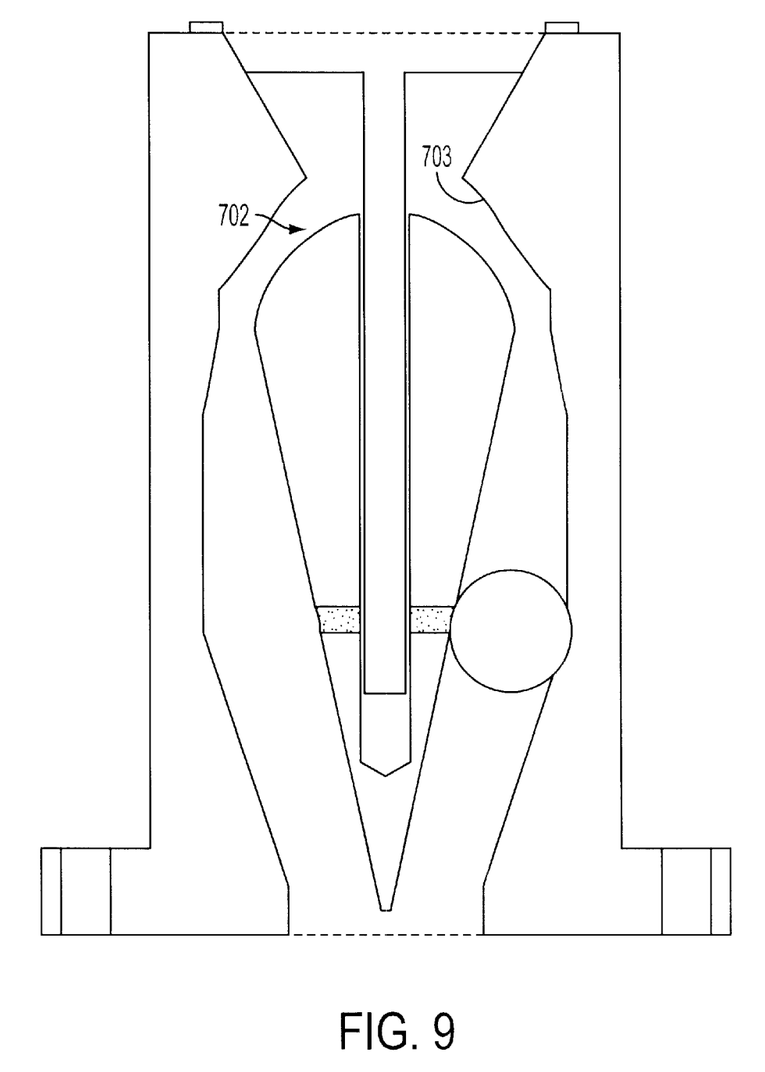
FIG. 9 is a cross-sectional diagram of a full-flow mechanical failsafe according to a fourth embodiment of the invention, in an inactive mode of operation.

The concept of a malleable material to improve the seal provided by the full flow mechanical failsafe (as described with respect to the gasket 601 in FIG. 8), could also be applied to a thin coating of malleable material such as gold or palladium deposited in a manner such as sputtering or plating, onto one or both of the metal surfaces 702, 703 involved in the spherical metal-to-metal seal created when the embodiment of the full flow mechanical failsafe shown in FIG. 9 activates. A high quality seal would therefore be formed when the full flow mechanical failsafe activated. Other malleable materials and means of applying them to the sealing surfaces are also possible, including, e.g. preparing a malleable material as an "O" ring set into a sealing surface on the sealing plug 504 or shell 506.

Figure 10:
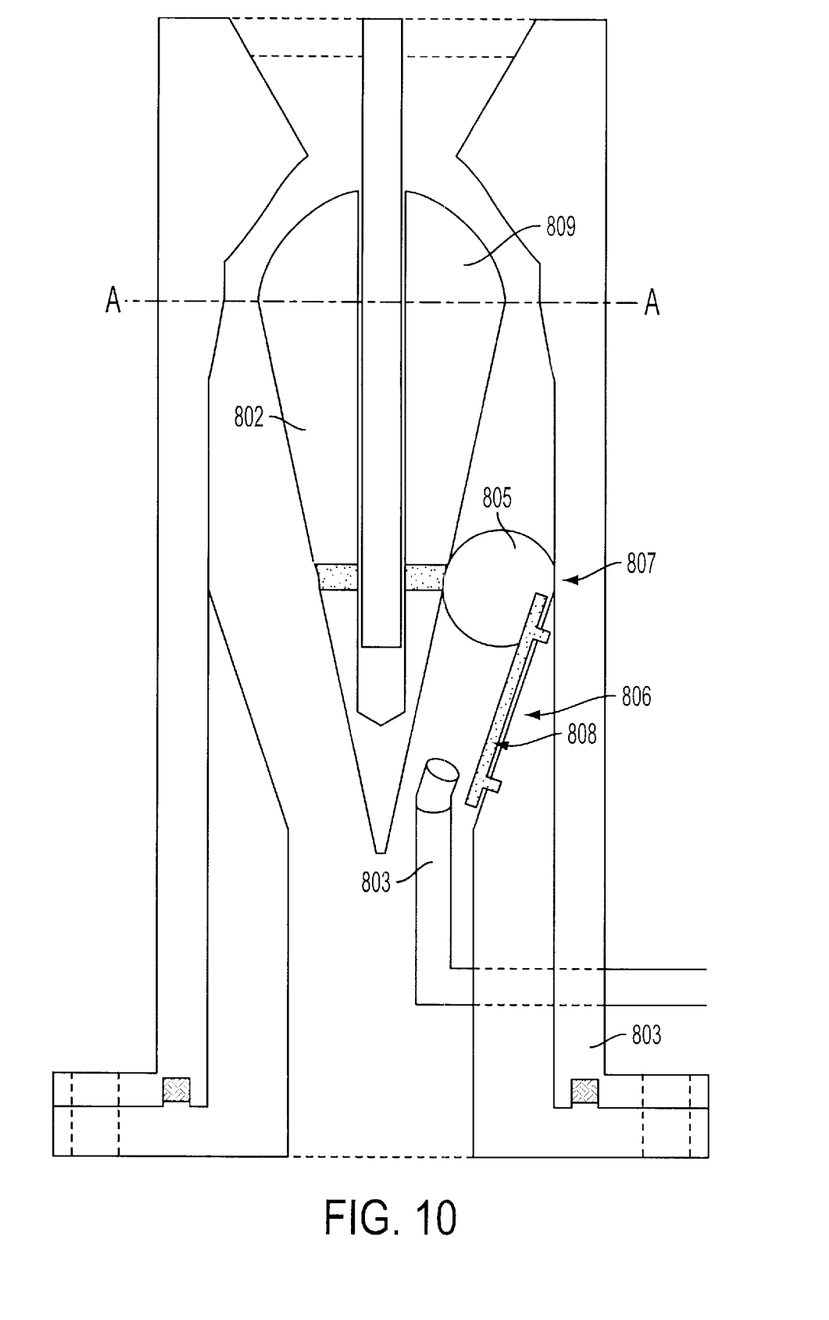
FIG. 10 is a cross-sectional diagram of a full-flow mechanical failsafe according to a fifth embodiment of the invention, in an inactive mode of operation.
Figure 11:
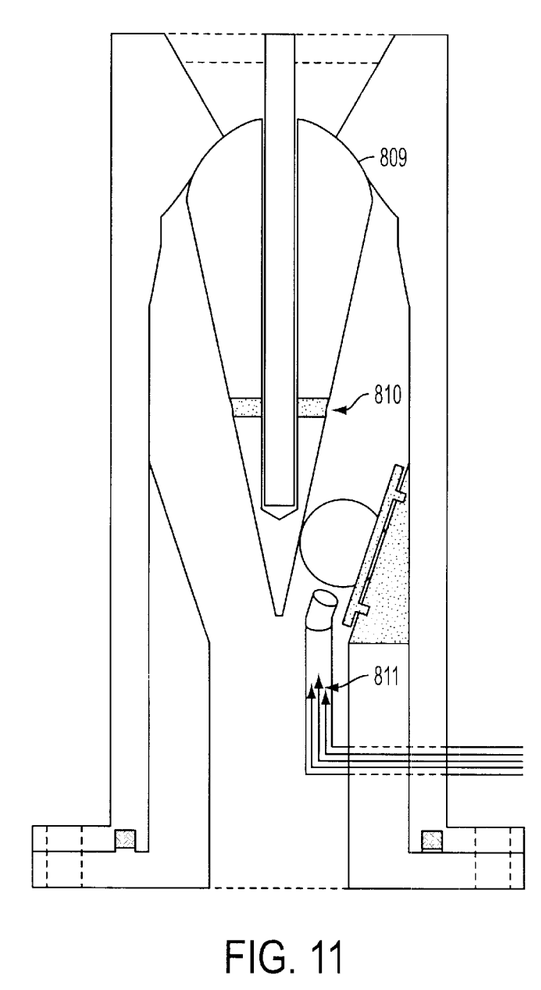
FIG. 11 is a cross-sectional diagram of a full-flow mechanical failsafe according to a sixth embodiment of the invention, in an inactive mode of operation.
Figure 12:
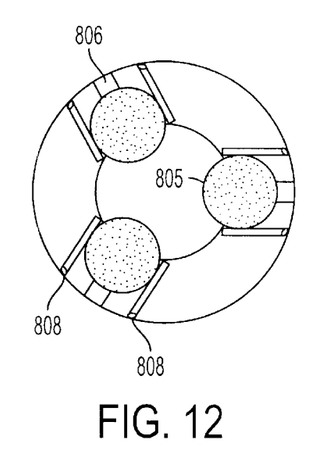
FIG. 12 is a detail of a rail for use with the sixth embodiment of the invention.
Figure 13:
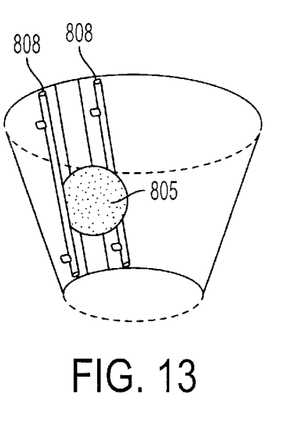
FIG. 13 is a detail of a rail for use with the sixth embodiment of the invention.

In a fifth embodiment, shown in FIG. 10, mechanical failsafe 802 could be reset to its open position without having to gain direct access to it. This feature might be applied, eg. in a particle-free process stream. As shown in FIGS. 10, 11, 12, and 13, the device may, eg. include three gas injection lances 803 that pass through the shell 804 (presumably outside of the process environment to a less harsh environment, where they would be attached to a compressed gas delivery system). These lances would be positioned to point up at the three locking balls 805 from underneath the positions where the balls would come to rest following activation.

By blasting short, but reasonably intense, pulses of gas 811 up at the locking balls (parallel to the slope of the inner wall of the shell), the locking balls would be pushed up their guidance grooves 806 until they reached their inactive positions (backed up against the inner wall of the shell 807). As the locking balls move up, the sealing plug 809 would move back down to its inactive position.

To keep the locking balls from moving laterally away from their guidance grooves, small railings 808 could be built into the interior wall of the lower shell along each side of each groove. These railings would be far enough away from the groove to keep the locking ball from touching them during activation. The railings would only be contacted if the locking ball tended to move laterally out of its guidance groove as it was being forced back up to its inactive position by the gas exiting the lance. As the locking balls are moved all the way to their inactive position, gravity pulls the sealing plug completely back down to its inactive position, at which time the locking balls reseat in the indentation 810 around the body of the sealing plug.

Figure 14:
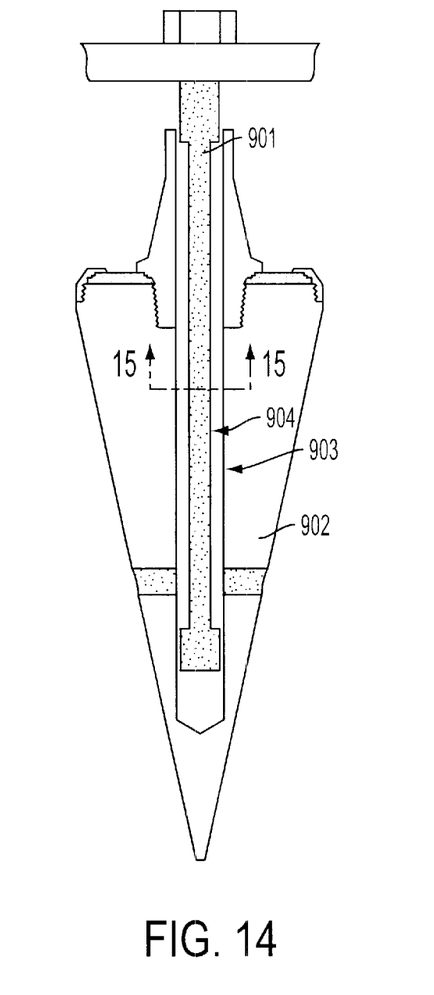
FIG. 14 is a cross-sectional diagram of a full-flow mechanical failsafe according to a seventh embodiment of the invention.

In a seventh embodiment, shown in FIG. 14, the dimensions of the alignment pin 901 are set so the pin will guide the sealing plug 902 up into its proper position during activation. To accomplish this guidance, the alignment pin may stay essentially centered in the shaft 903 that runs down the center of the sealing plug. However, instances may exist where particles could contaminate the close tolerance between the alignment pin and the shaft prior to activation. Such contamination could bind the movement of the sealing plug during activation.

To minimize the chance that particles become trapped between the alignment pin and the shaft, as shown for one embodiment in FIG. 14, the alignment pin could be shaped with a reduced dimension 904 in its middle region, with only the ends of the alignment pin having the full diameter required to keep it centered in the shaft.

Figure 15:
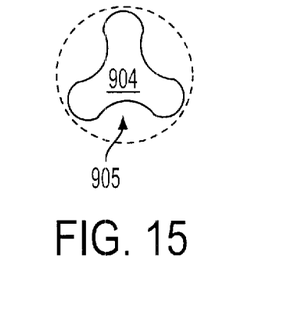
FIG. 15 is a cross-sectional of an alignment pin 904 for use with the seventh embodiment of the invention.

In another embodiment of this feature (shown in FIG. 15), the alignment pin could be made with flutes, or grooves 905 down its length. The flutes could extend the complete length of the pin, decreasing the likelihood the initial movement of the sealing plug during activation would generate a temporary pressurization of the portion of the bore in the plug below the pin, that could subsequently interfere with the rest of the movement of the sealing plug during activation. These flutes would also reduce the likelihood that dirt particles (or other contamination) could cause the bore in the sealing plug to interfere with the movement of the pin (relative to the sealing plug).

The invention having been thus described, it be apparent to those skilled in the art that the same may be varied in many ways without departing from the spirit and scope of the invention. Accordingly, any and all such modifications are intended to be covered by the following claims.

What is claimed is:

1. A full-flow failsafe, comprising:
   a reaction tube for containing a flowing fluid stream;
   a first shell having first apertures at each end thereof for enabling said fluid stream to flow therethrough, a first one of said first apertures being coupled to said reaction tube;
   a first sealing plug movably positioned within said first shell, said first sealing plug being oriented in a first position during normal operation of said reaction tube to permit fluid flow through said first shell, and being moved by increased fluid velocity to a second position wherein said first sealing plug forms a sealing contact with a second one of said first apertures, upon failure or breakage of said reaction tube; and
   at least one first locking mechanism supporting said first sealing plug in said first position, and being moved to a locking position for securing said first sealing plug in said second position in response to said movement of said sealing plug.

2. A full-flow failsafe as set forth in claim 1, comprising further:
   a second shell having second apertures at each end thereof for enabling said fluid stream to flow therethrough, a first one of said second apertures being coupled to said second one of said first apertures;
   a second sealing plug movably positioned within said shell, said sealing plug being oriented in a third position during normal operation of said reaction tube to permit fluid flow through said shell, and being moved by increased fluid velocity to a fourth position wherein said sealing plug forms a sealing contact with a second one of said second apertures, upon failure or breakage of said reaction tube; and at least one second locking mechanism supporting said second sealing plug in said third position, and being moved to a locking position for securing said sealing plug in said fourth position in response to said movement of said sealing plug.

3. A full-flow failsafe as set forth in claim 1, wherein said second one of said first apertures comprises further a taper.

4. A full-flow failsafe as set forth in claim 1, comprising further a malleable material coatingly applied at a point of said sealing contact.

5. A full-flow failsafe as set forth in claim 3, wherein said malleable material is selected from the group consisting of:

gold;

palladium; and platinum.

6. A full-flow failsafe as set forth in claim 1, wherein said first locking mechanism comprises a sphere.

7. A full-flow failsafe as set forth in claim 6, wherein a bottom interior surface of said first shell is sloped, and said sphere rolls downward between said first sealing plug and said sloped surface to a locking position locking said first sealing plug in sealing contact with said second one of said first apertures upon said movement of said first sealing plug.

8. A full-flow failsafe as set forth in claim 6, further comprising two additional spheres located around a bottom surface of said first sealing plug.

9. A full-flow failsafe as set forth in claim 6, further comprising a gas injection lance disposed in said first one of said first apertures, said gas injection lance directing a gas at said sphere to urge said sphere upward between said first sealing plug and said sloped surface to a position supporting said first sealing plug in said first position.

10. A full-flow failsafe as set forth in claim 9, further comprising a rail disposed on said sloped surface to guide a movement of said sphere.

11. A full-flow failsafe as set forth in claim 6, further comprising a groove cut into said sloping surface to guide a movement of said sphere.

12. A full-flow failsafe as set forth in claim 6, further comprising an indentation in a surface of said sealing plug contacting said sphere, to hold said sphere in place during normal operating conditions of said reaction tube.

13. A full-flow failsafe as set forth in claim 1, further comprising an alignment pin mounted on said first shell to maintain alignment of first sealing plug with respect to said second first aperture upon movement of said first plug into contact with said second one of said first apertures.

14. A full-flow failsafe as set forth in claim 13, wherein said alignment pin comprises a reduced dimension on a side thereof.

15. A full-flow failsafe as set forth in claim 13, wherein said alignment pin comprises a flute on a side thereof.

16. A full-flow failsafe as set forth in claim 13, wherein said alignment pin comprises a groove on a side thereof.

17. A full-flow failsafe as set forth in claim 1, wherein the interior of said first shell is dimensioned to cause upward pressure against said first sealing plug to increase as said first sealing plug advances toward said second one of said first apertures upon reaction tube failure or breakage.

18. A full-flow failsafe as set forth in claim 1, further comprising a sealing gasket mounted at a point of said sealing contact.

19. A full-flow failsafe as set forth in claim 17, wherein said sealing gasket comprises further a foil cover.

20. A full-flow failsafe as set forth in claim 1, wherein said fluid is a gas.

* * * * *